(12) United States Patent
Lee et al.

(10) Patent No.: US 9,100,065 B2
(45) Date of Patent: *Aug. 4, 2015

(54) SYMBOL VECTOR-LEVEL COMBINING TRANSMITTER FOR INCREMENTAL REDUNDANCY HARQ WITH MIMO

(71) Applicant: Marvell World Trade Ltd., St. Michael (BB)

(72) Inventors: Jungwon Lee, San Diego, CA (US); Yakun Sun, Sunnyvale, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/283,802

(22) Filed: May 21, 2014

(65) Prior Publication Data
US 2014/0254719 A1 Sep. 11, 2014

Related U.S. Application Data

(63) Continuation of application No. 13/463,017, filed on May 8, 2009, now Pat. No. 8,750,418.

(60) Provisional application No. 61/051,941, filed on May 9, 2008.

(51) Int. Cl.
*H04L 27/00* (2006.01)
*H04B 7/02* (2006.01)
(Continued)

(52) U.S. Cl.
CPC .............. *H04B 7/024* (2013.01); *H04B 7/0413* (2013.01); *H04L 1/0042* (2013.01); *H04L 1/0643* (2013.01); *H04L 1/1819* (2013.01); *H04L 1/0068* (2013.01)

(58) Field of Classification Search
CPC ....... H04B 7/024; H04B 7/0413; H04L 27/00
USPC .................. 375/385, 298–300, 302, 303, 308
See application file for complete search history.

(56) References Cited

U.S. PATENT DOCUMENTS

| 5,862,190 A | 1/1999 | Schaffner |
| 6,189,123 B1 | 2/2001 | Nystrom et al. |

(Continued)

OTHER PUBLICATIONS

International Search Report and Written Opinion of the International Search Authority for PCT/US2009/002881 dated Jan. 18, 2010.

(Continued)

*Primary Examiner* — Kevin M Burd

(57) ABSTRACT

Techniques are provided for transmitting and receiving a mother code in an incremental redundancy hybrid automatic repeat-request protocol. A set of information bits corresponding to a message may be encoded and interleaved to produce the mother code. Each bit position of the mother code may be mapped to an output symbol, and each output symbol may be mapped to an antenna for transmission. One or more transmissions of symbols contained in the output symbols may be performed, where each transmission may include puncturing the mother code by selecting one or more symbols from the of output symbols, and transmitting each symbol in the one or more symbols on an antenna corresponding to that symbol. The mother code may be decoded, in part, by determining combinable bits contained within a set of received symbols, and computing one or more log-likelihood ratio values corresponding to each symbol in the set of received symbols.

20 Claims, 7 Drawing Sheets

(51) Int. Cl.
*H04L 1/06* (2006.01)
*H04L 1/18* (2006.01)
*H04B 7/04* (2006.01)
*H04L 1/00* (2006.01)

(56) References Cited

U.S. PATENT DOCUMENTS

| | | |
|---|---|---|
| 6,700,867 B2 | 3/2004 | Classon et al. |
| 6,873,665 B2 | 3/2005 | Kobayashi et al. |
| 7,003,709 B2 | 2/2006 | Wengerter et al. |
| 7,095,812 B2 | 8/2006 | Chan et al. |
| 7,180,968 B2 | 2/2007 | Miyauchi et al. |
| 7,457,372 B2 | 11/2008 | Hwang et al. |
| 7,526,037 B2 | 4/2009 | Hoo |
| 7,526,038 B2 | 4/2009 | McNamara |
| 7,564,933 B2 | 7/2009 | Marrow |
| 7,764,743 B2 | 7/2010 | Farag |
| 7,787,561 B2 | 8/2010 | Von Elbwart |
| 7,945,008 B2 | 5/2011 | Milliner et al. |
| 7,961,826 B2 | 6/2011 | Waters et al. |
| 8,045,632 B2 | 10/2011 | Batra et al. |
| 8,045,652 B1 | 10/2011 | Bitran et al. |
| 8,065,579 B2 | 11/2011 | Hoshino et al. |
| 8,219,878 B1 | 7/2012 | Varnica et al. |
| 8,223,870 B2 | 7/2012 | Waters et al. |
| 8,750,418 B2 * | 6/2014 | Lee et al. ............... 375/299 |
| 2004/0136465 A1 | 7/2004 | Hwang et al. |
| 2004/0213184 A1 | 10/2004 | Hu et al. |
| 2007/0030917 A1 | 2/2007 | Farag |
| 2009/0279633 A1 | 11/2009 | Lee et al. |
| 2009/0282311 A1 | 11/2009 | Lee et al. |

OTHER PUBLICATIONS

Edward W. Jang et al., "Optimal Combining Schemes for MIMO Systems with Hybrid ARQ", Information Theory, IEEE International Symposium, Jun. 24, 2007, pp. 2286-2290.

Majonen, K et al., "Comparison of Multiantenna Techniques for High-Speed Packet Communication", Indoor and Mobile Radio Communications, IEEE International Symposium, Sep. 5, 2004, pp. 1736-1740.

* cited by examiner

SYMBOL VECTOR-LEVEL COMBINING TRANSMITTER FOR INCREMENTAL REDUNDANCY HARQ WITH MIMO

CROSS-REFERENCE TO RELATED APPLICATIONS

This application is a continuation of U.S. patent application Ser. No. 12/463,017, filed May 8, 2009 (now pending), which claims the benefit under 35 U.S.C. §119(e) of U.S. Provisional Application No. 61/051,941, filed May 9, 2008, each of which is hereby incorporated by reference herein in its entirety.

This application is related to U.S. patent application Ser. No. 13/605,099, filed Sep. 6, 2012 (now U.S. Pat. No. 8,516,353), which is a continuation of commonly owned U.S. patent application Ser. No. 12/463,025, filed May 8, 2009 (now U.S. Pat. No. 8,271,861), entitled "SYMBOL LEVEL SYMBOL VECTOR-LEVEL COMBINING RECEIVER FOR INCREMENTAL REDUNDANCY HARQ WITH MIMO".

BACKGROUND OF THE DISCLOSURE

This disclosed technology relates generally to decreasing the bit- and/or symbol-error rate of multiple-input multiple-output (MIMO) communications systems, and more particularly, to improving the decoding performance of such systems using incremental redundancy (IR) hybrid automatic repeat-request (HARQ) transmission techniques with symbol vector-level decoding.

Multiple-input multiple-output communication systems (e.g., communications systems using multiple transmit and/or receive antennas) have proven useful in addressing a wide array of challenges in current and next-generation wireless systems. For example, MIMO systems have been shown to provide resiliency to interference, rapid mobility, and/or deep fades in channel quality. Additionally, MIMO technology is often used with HARQ transmission, for example Chase combining and IR techniques, to improve transmission throughput while reducing the number of bits needed to decode each received codeword. For example, MIMO IR HARQ techniques have been adopted in a wide variety of standards, including WiMAX, LTE, and HSDPA/HSUPA.

However, MIMO IR HARQ systems may use receiver structures in which data is decoded sub-optimally, thereby decreasing the decoding bit- and/or symbol-error rate relative to an optimal receiver structure. Such sub-optimal designs may reduce application quality and/or increase system latency. Therefore, there exists a need for optimal, or nearly-optimal, decoding strategies for use in MIMO IR HARQ systems. In particular, there exists a need for optimal or near-optimal symbol vector-level combining techniques for use in MIMO IR HARQ wireless systems.

SUMMARY OF THE DISCLOSURE

Communications systems, techniques, and processes are disclosed for transmitting a mother code in an IR HARQ protocol. In particular, systems, techniques, and processes are disclosed for iteratively transmitting and receiving symbols according to symbol vector-level combining in a MIMO IR HARQ protocol. The lowered error-floor and/or increase information rate provided by such a transmission architecture may lead to improved application performance, fewer interruptions in service, and/or larger data transmission rates at a reasonable level of computational complexity.

On aspect of the invention relates to a technique for transmitting a mother code in an incremental IR HARQ protocol. A set of information bits may be obtained, processed, and transmitted by a MIMO transmitter. The information bits may be encoded and interleaved to produce the mother code, and each bit position of the mother code may be assigned to an output symbol from among one or more output symbols. Each output symbol may be mapped to antenna for transmission. In an embodiment, one or more transmission may be performed to communicate the message corresponding to the information bits, and encoded in the mother code, to a receiver. For example, each transmission may include puncturing the mother code by selecting symbol vectors from the one or more output symbols. Each symbol may then be transmitted on a corresponding antenna.

In an embodiment, retransmissions may be initiated in response to a time-out at the MIMO transmitter and/or a retransmission request. In an embodiment, the encoding and interleaving of the information bits may be done by applying an error detection code and/or a forward error correct code to the information bits. In an embodiment, the repeated transmissions of symbols from the mother code may iteratively lower the information rate of the received codeword at the receiver to a rate no smaller than the information rate of the mother code.

Another aspect of the invention relates to a technique for receiving and decoding a mother code in an incremental IR HARQ protocol. In an embodiment, decoding may be performed on set of received symbols, where the set of received symbols may include one or more combinable symbols, and where the one or more combinable symbols may include a set of original symbols. In an embodiment, a set of bits contained within the set of original symbols may be determined, and a bit from the set of bits may be selected. A log-likelihood ration (LLR) value corresponding to each symbol in the set of original symbols may be determined based, at least in part, on the selected bit. Further, an overall LLR value may be produced by summing the LLR values corresponding to each symbol in the set of original symbols, and a mother code may be decoded by, for example, evaluating the overall LLR value corresponding to the selected bit.

Further features of the invention, its nature and various advantages will be more apparent from the accompanying drawings and the following detailed description.

BRIEF DESCRIPTION OF THE FIGURES

The above and other aspects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
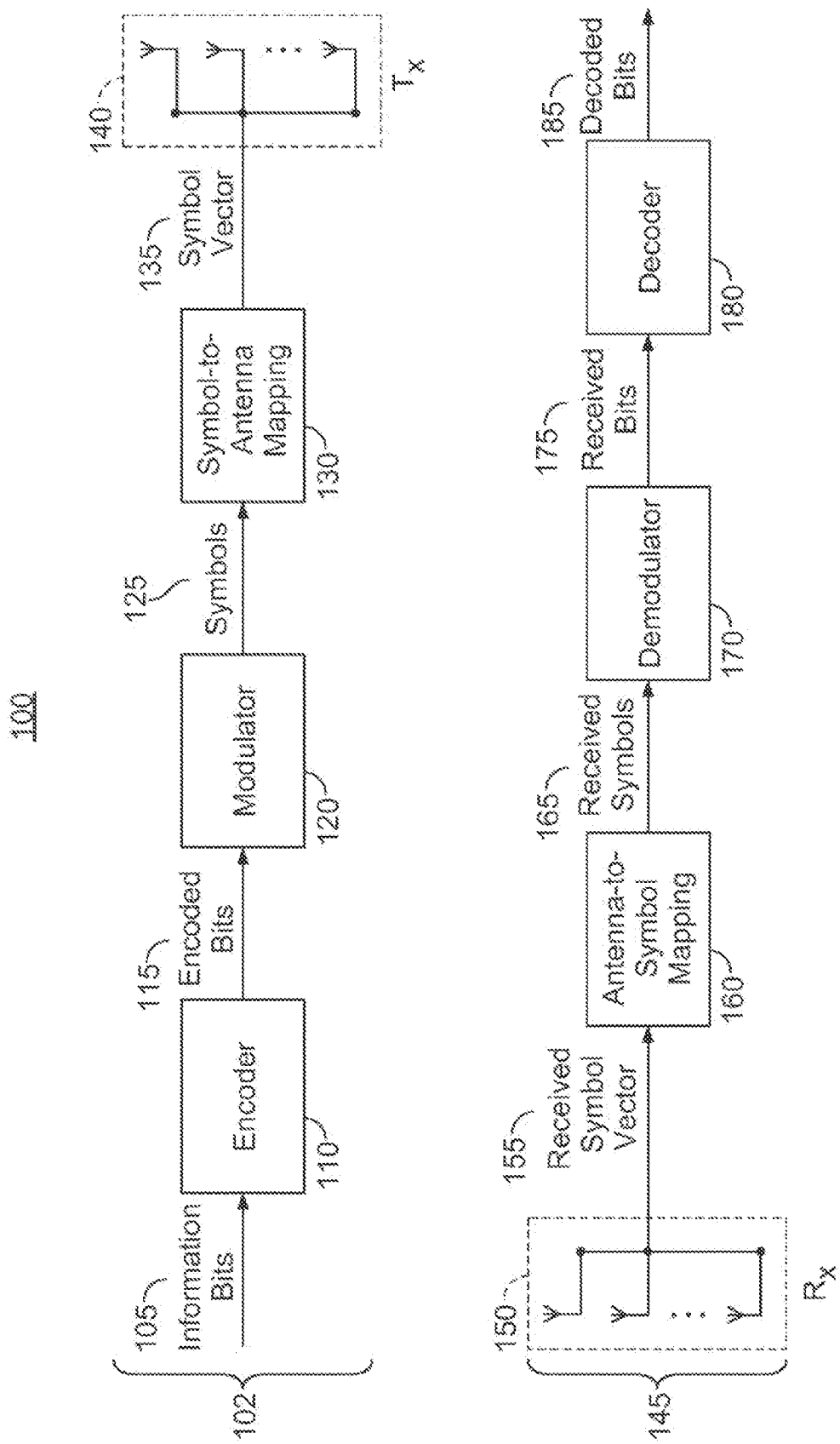
FIG. 1 shows a simplified diagram of a wireless multiple-input multiple-output (MIMO) communications system that includes a transmitter side and a receiver side in accordance with an embodiment.

FIG. 1 shows a simplified diagram of a wireless multiple-input multiple-output (MIMO) communications system that includes a transmitter side and a receiver side in accordance with an embodiment. Communications system 100 may transmit information from a transmitter 102 to a receiver 145 using an error detection and/or correction technique such as a hybrid automatic repeat request (HARQ) technique. For example, communications system 100 may use a HARQ technique based on incremental redundancy (IR) to reliably transmit information from transmitter 102 to receiver 145. Communications system 100 may be used to transmit data according to well-known wireless communications protocols including WiMAX, LTE, HSDPA/HSUPA, and/or Bluetooth.

To transmit information, communications system 100 may receive or otherwise obtain information bits 105. Information bits 105 may be obtained, e.g., from any suitable application or processor. Information bits 105 may be produced by a computer or other data application, or may be the output of a analog-to-digital processor used, e.g., to digitize speech data in a cellular application. Information bits 105 may be encoded by an encoder such as encoder 110. Encoder 110 may encode information bits 105 by adding error-detection (ED) bits to information bits 105 and/or by adding forward error correction (FEC) bits to information bits 105. In an embodiment, encoder 110 may add ED bits to information bits 105 using a cyclic redundancy check (CRC) algorithm, and may add FEC bits to the resulting bit sequence using a suitable block code, Reed-Solomon code, or Turbo code. Encoder 110 may output encoded bits 115.

Communications system 100 may pass encoded bits 115 to modulator 120 for further processing. Modulator 120 may assign groups or segments of encoded bits 115 to symbols belonging to a suitable signal constellation. For example, modulator 120 may transform encoded bits 115 to symbols 125 using a signal constellation such as Binary Phase Shift Keying (BPSK), Quadrature Phase Shift Keying (QPSK), Quadrature Amplitude Modulation (QAM), and/or any other suitable signal constellation. The number of signal points in the constellation used by modulator 120 may be determined based on factors including the desired data transmission rate of communications system 100, the number of transit antennas 140, the number of receive antennas 150, and/or the expected operational signal-to-noise ratio (SNR) at receiver 145.

Communications system 100 may transmit symbols on one ore more transmit antennas 140 based on assignments determined by symbol-to-antenna mapping module 130. Symbol-to-antenna mapping module 130 may assign (or "map") symbols produced by modulator 120 to transmit antennas 140. For example, if transmit antennas 140 includes exactly four antennas, then symbol-to-antenna mapping module 130 may alternatively assign symbols 125 to the four antennas in a round-robin fashion in which the first, fifth, and ninth symbols are assigned to the first antenna, the second, sixth, and tenth symbols are assigned to the second antenna, and so on. The symbols transmitted using transmit antennas 140 during one symbol period may be represented by symbol vector 135. For example, if transmit antennas 140 contains exactly four antennas, then symbol vector 135 may be a vector containing four elements, where each element represents a current symbol to be transmitted on a corresponding antenna.

Information transmitted by transmit antennas 140 may be received by receive antennas 150. For example, receive antennas 150 may be aligned to receive information using beam-steering or any other another suitable reception technique. Receive antennas 150 may include the same number of antennas as transmit antennas 140, or may include a different number. For example, transmit antennas 140 may include exactly four antennas, while receive antennas 150 may include exactly two antennas. Symbols received at receive antennas 150 during one symbol interval may be grouped into received symbol vector 155, and may be mapped into a serial symbol stream by antenna-to-symbol mapping module 160. For example, antenna-to-symbol mapping module may produce received symbols 165 from consecutive received symbol vectors obtained during consecutive transmission slots of communications system 100.

Communications system 100 may demodulate received symbols 165 to produce a sequence of received bits 175, using, for example, demodulator 170. In an embodiment, demodulator 170 may receive bits encoded by a QAM constellation (where the encoding is performed by, for example, modulator 120), and may demodulate the QAM symbols using nearest-neighbor decoding based on Euclidean distance to produce a bit sequence, for example, the bit sequence received bits 175. Communications system 100 may use decoder 180 to decode (e.g., detect and/or correct) errors present in received bits 175 to produce decoded bits 185.

Communications system 100 may employ a HARQ transmission protocol at transmitter 102. In this case, decoder 180 may first decode received bits 175 by decoding the FEC code used at modulator 120. For example, if a turbo FEC code is used at modulator 120, then decoder 180 may use turbo decoding to decode received bits 175. Decoder 180 may use ED decoding to detect if all errors present in received bits 175 have been corrected. For example, if a cyclic redundancy check ED technique is used to produce encoded bits 115 at modulator 120, then decoder 180 may apply a suitable detection process to determine if any non-correctable errors are present in the decoded codeword. If decoder 180 determines that no errors are present, or that all errors that are present are correctable, then decoder 180 may output decoded bits 185. Decoded bits may be an exact replica of information bits 105.

If, however, decoder 180 determines that non-correctable errors are present in received bits 175, communication system 100 may employ HARQ to retransmit data corresponding to information bits 105 until this data can be successfully decoded by decoder 180. For example, receiver 145 may request retransmission of data related to information bits 105, or transmitter 102 may automatically retransmit information related to information bits 105 based on, e.g., a timing mechanism or time-out feature. The retransmitted information may not be an exact replica of the originally transmitted information, but rather, related to information that provides additional redundancy to receiver 145. This retransmission process may continue according to the HARQ technique employed by communications system 100 until either decoder 180 successfully decodes information bits 105 or until a specified number of retransmissions has been attempted.

Figure 2:
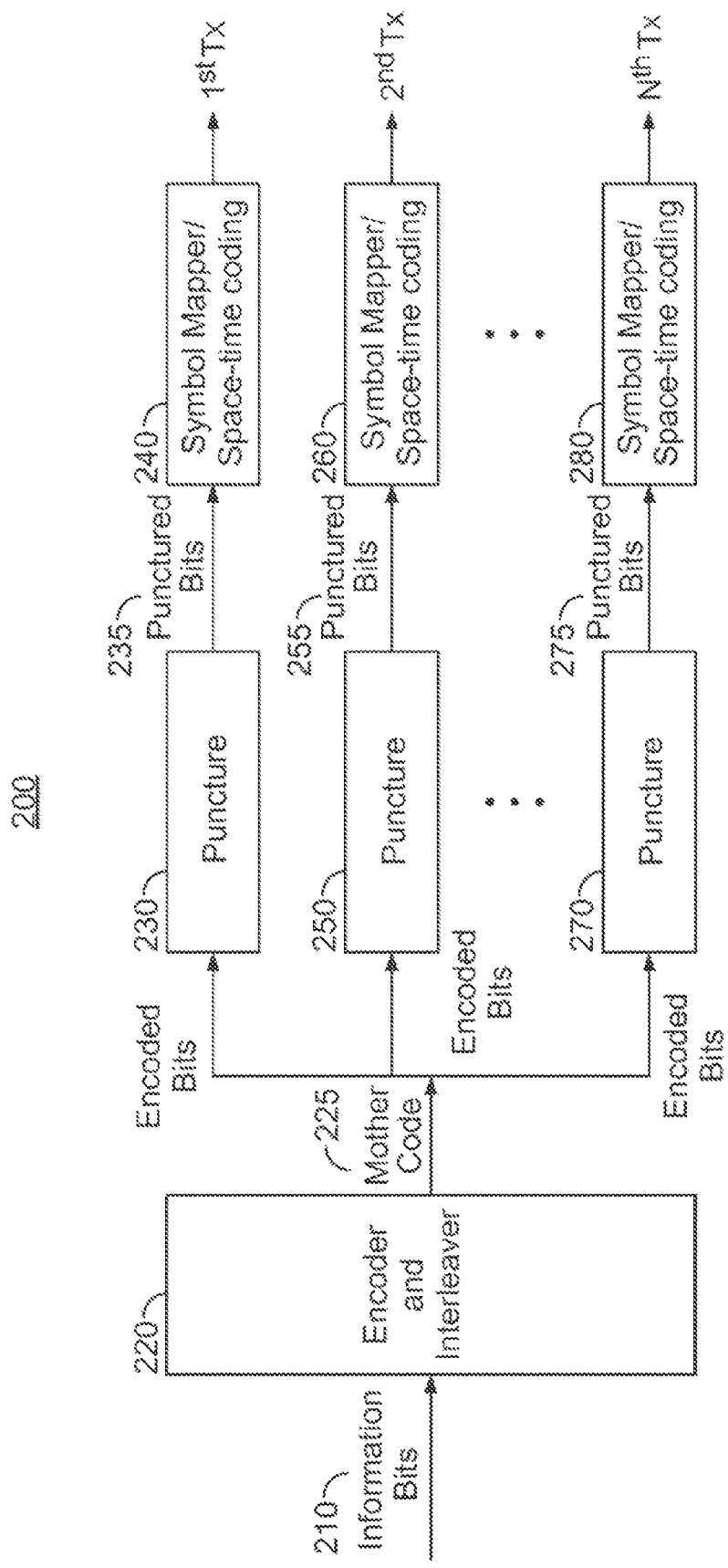
FIG. 2 shows a simplified diagram of a HARQ transmitter architecture that may be used by, e.g., the communications system of FIG. 1, in accordance with an embodiment.

FIG. 2 shows a simplified diagram of a HARQ transmitter architecture that may be used by, e.g., communications system 100 (FIG. 1). Transmitter 200 may be a further embodiment of transmitter 102 (FIG. 1). Transmitter 200 may use IR HARQ to transmit information bits 210 to a receiver, such as receiver 145 (FIG. 1).

Figure 4:
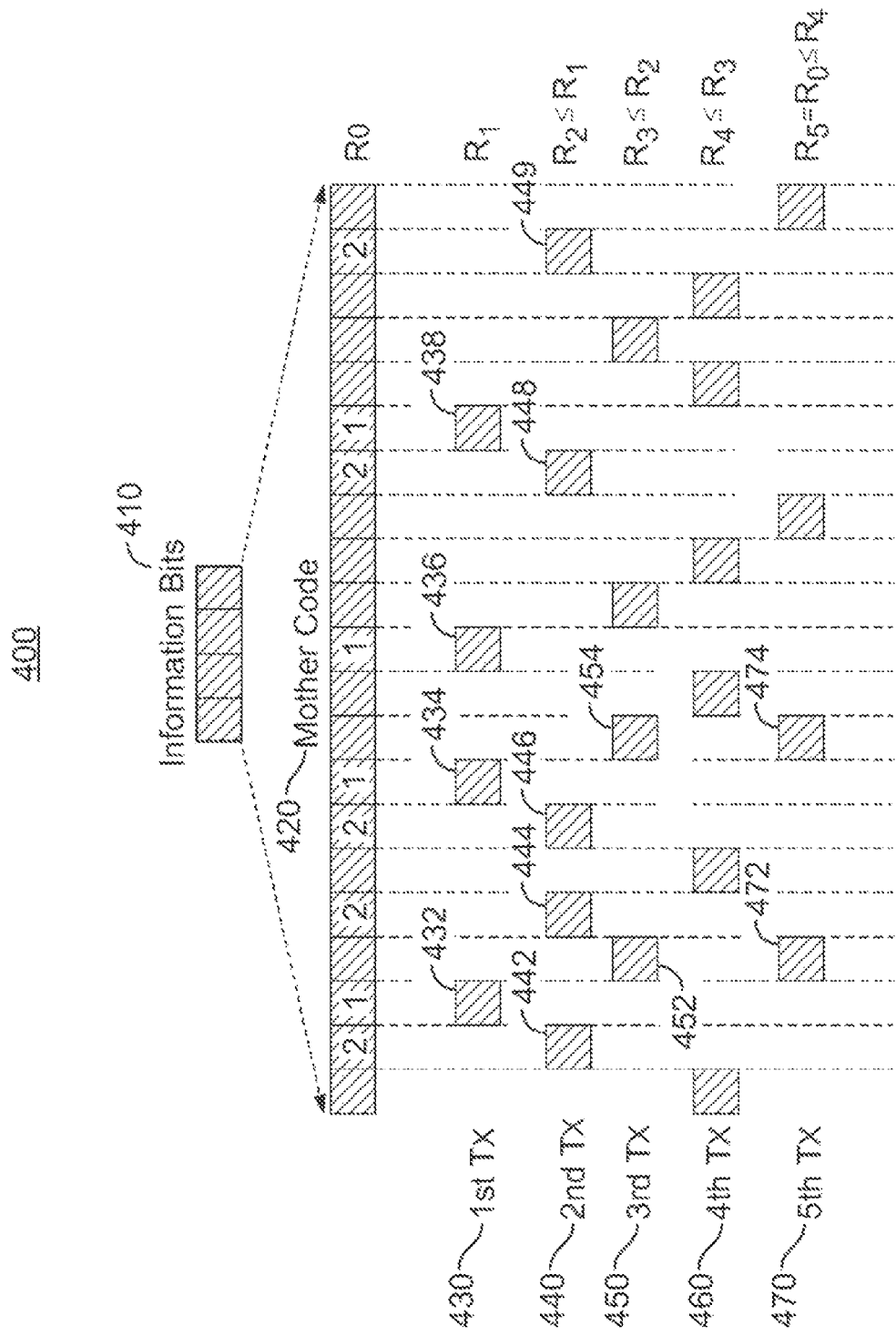
FIG. 4 shows a simplified transmission technique that may be used by a MIMO IR HARQ transmitter for symbol vector-level combining in accordance with an embodiment.

Transmitter 200 may first receive or obtain information bits 210. Information bits 210 may be similar to identical to information bits 105 (FIG. 1). Encoder and interleaver 220 may generate a mother code from information bits 210. For example, mother code 225 may be low-rate code generated from information bits 210 by adding ED and FEC using any suitable technique. In an embodiment, communications encoder and interleaver 220 may use a cyclic redundancy check for ED and a Turbo code or Reed Solomon code for FEC to produce mother code 225. Encoder and interleaver 220 may add redundancy to a relatively small number of information bits, such as information bits 410 (FIG. 4) to produce a larger mother code, such as mother code 420 (FIG. 4).

Transmitter 200 may initially transmit selected bits from mother code 225, followed by additional selected bits from mother code 225 if there is a decoding error or timeout at the receiver. In an embodiment, transmitter 200 may initially select a group of bits from mother code 225 (i.e., "puncture" mother code 225) using puncture module 230. For example, in an embodiment, mother code 225 may be represented by mother code 420 (FIG. 4), and transmitter 200 may puncture mother code 420 (FIG. 4) using puncture module 230 to select bits 432, 434, 436, and 438 (all of FIG. 3) for transmission. Punctured bits 235 may be mapped to antennas for transmission. Punctured bits 235 may be transmitted to a receiver, such as receiver 145, and/or may be coded using a suitable space time coding technique at symbol mapper 240.

If, at the receiver, a decoding error occurs or a timeout occurs, the receiver may request that transmitter 200 retransmit information related to the mother code 225. Transmitter 200 may, upon the second transmission, choose a different set of punctured bits from mother code 225 to transmit at puncture module 250. In an embodiment, mother code 225 may be represented by mother code 420 (FIG. 4), and transmitter 200 may select to puncture bits 442, 444, 446, 448, and 449 (all of FIG. 4) during second transmission 440. Transmitter 200 may select to puncture these bits at puncture module 250 and may map punctured bits 255 to transmit antennas at symbol mapper 260. Transmitter 200 may continue to retransmit selected bits from mother code 225 in this manner until either information bits 210 are correctly decoded at the receiver, or until a specified maximum number of retransmissions is attempted. For example, transmitter 200 may attempt a total of N transmissions as shown in FIG. 2.

Figure 3:
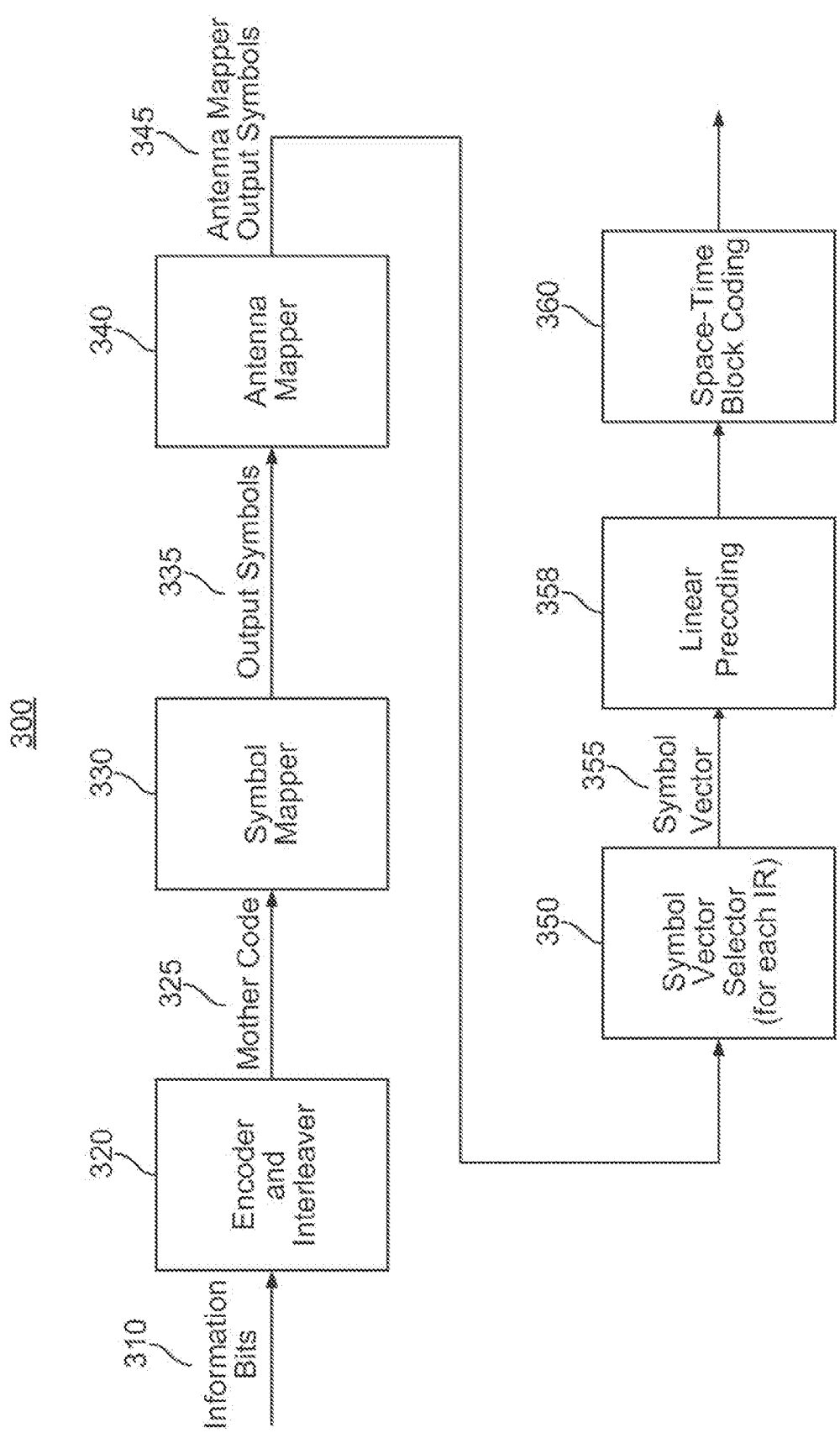
FIG. 3 shows a simplified transmitter and encoding strategy that may be used by a IR HARQ transmitter for symbol vector-level combining in accordance with an embodiment.

FIG. 3 shows a simplified transmitter and encoding strategy that may be used by a IR HARQ transmitter for symbol vector-level combining. Transmitter 300 may be a further embodiment of transmitter 102 (FIG. 1). Transmitter 300 may be advantageous in decreasing the bit- or symbol-error rate in a communications system at least because symbol vector-level combining of repeated transmissions may be more accurate than, for example, bit-level combining of those repeated transmissions.

Transmitter 300 may generate or otherwise obtain information bits 310, and information bits 310 may be similar or identical to information bits 105 (FIG. 1) or 210 (FIG. 2). Transmitter 310 may then use encoder and interleaver 320 to generate mother code 325. For example, encoder and interleaver 320 may operate similarly or identically to encoder and interleaver 220.

Transmitter 300 may use symbol mapper module 330 to assign (or map) selected bit positions in mother code 325 to particular symbols. For example, mother code 325 may correspond to mother code 420 of FIG. 4. In this case, symbol mapper 330 may assign each bit-position labeled '1' in mother code 420 (FIG. 4) to a particular symbol in output symbols 335, and may assign each bit-position labeled '2' in mother code 420 (FIG. 4) to another particular symbol in output symbols 335. Each bit position in mother code 325 may be assigned to a single or to multiple symbols in this way. Assigning bit positions of mother code 325 to symbols prior to puncturing mother code 325 may advantageously allow symbol vector-level combining at the receiver, as described further in relation to FIG. 4. Such symbol vector-level combining may typically lead to improved bit- and symbol-error rate performance compared to a ARQ communications system protocol that uses, for example, only bit-level combining.

Transmitter 300 may pass output symbols 335 to antenna mapper module 340. Antenna mapper module 340 may assign each of the symbols contained in output symbols 335 to a particular antenna. For example, if transmitter 300 is connected to exactly four antennas, then antenna mapper module 340 may assign exactly or approximately one-fourth of all symbols in output symbols 335 to each of the four antennas. The assignment of symbols in output symbols 335 to antennas may be done using round-robin allocation or any other suitable technique, such as a round-robin or time-multiplexing technique.

Transmitter 300 may provide the output symbols of antenna mapper 340, referred to as antennas mapper output symbols 345, to symbol vector selector 350. Using symbol vector selector 350, transmitter 300 may select a symbol for transmission on each transmit antenna during the current symbol slot. For example, symbol vector selector 350 may select, for each transmit antenna of transmit antennas 140 (FIG. 1), a single symbol from the symbols assigned to that antenna by antenna mapper module 340. Communications transmitter 300 may provide symbol vector 355, output by symbol vector selector 350, to linear precoding module 358. Linear precoding module 358 may use a transform to convert symbol vector 355 to any output vector suitable for transmission on one or more transmit antennas. For example, linear precoding module 358 may apply one or more matrix multiplications to symbol vector 355 to produce an output vector. In an embodiment, linear precoding module 358 may apply a matrix multiplication that assigns each symbol of symbol vector 355 to a transmit antenna. For example, linear precoding module 358 may apply a cyclically-shifted identify matrix, of any suitable dimension and/or suitable shift amount, to symbol vector 355 to produce an output vector. The output vector of linear precoding module 358 may, for example, by applied to space-time block coding module 360 for processing and additional coding prior to transmission on one or more transmission antennas, for example, transmission antennas 140 (FIG. 1). It is emphasized that space-time block coding module 360 is optional, and that transmitter 300 may function exactly or similarly as described above even if space-time block coding module 360 is omitted from transmitter 300.

Transmitter 300 may be advantageous in lowering the bit- or symbol-error rate at a communications receiver at least because transmitter 300 maps bit positions of mother code 325 to symbols prior to puncturing mother code 325. For example, in transmitter 300, symbol mapper module 300 occurs prior to symbol vector selector 350. Mapping the bit positions of mother code 325 to symbols prior to puncturing mother code 325 may be useful at least because such a technique may enable a communications receiver, such as communications receiver 145 (FIG. 1), to aggregate and combine duplicative symbols transmitted during multiple iterations of a HARQ protocol, rather than only duplicative bits. By combining received information on a symbol vector-level rather than bit-level, a communications receiver may provide a lower bit- or symbol-error rate than would be possible otherwise.

Transmitter 300 depicts a simplified transmission and encoding strategy that may be used by a IR HARQ transmitter for symbol vector-level combining. Various embodiments of a corresponding symbol vector-level receiver and decoding structure that may advantageously be used in combination with transmitter 300 for lowering the bit- or symbol-error rate of a communications system will be described in relation to FIG. 5.

FIG. 4 shows a simplified transmission technique that may be used by a MIMO IR HARQ transmitter for symbol vector-level combining. The transmission technique depicted in FIG. 4 may be used to select portions of a mother code, for example, mother code 325 (FIG. 3), for incremental transmission by a MIMO transmitter such as MIMO transmitter 102 (FIG. 1) or MIMO transmitter 300 (FIG. 3).

Symbol vector-level IR HARQ process 400 may be used to transmit information bits 410 from a transmitter to a receiver. Information bits 410 may correspond to, for example, information bits 105 (FIG. 1) or 310 (FIG. 3). Symbol vector-level IR HARQ process 400 may not transmit information bits 410 directly, but may rather transmit a mother code such as mother code 420 that is generated based on information bits 410. Mother code 420 may be generated, for example, by an encoder and/or interleaver such as encoder 110 (FIG. 1) or encoder and interleaver 320 (FIG. 3) based on a suitable ED technique and/or FEC technique.

Symbol vector-level IR HARQ process 400 may assign each bit position of mother code 420 to a symbol. For example, each bit-position labeled '1' in mother code 420 may be assigned to a first symbol, each bit-position labeled '2' in mother code 420 be assigned to a second symbol, and this process may continue until each bit-position of mother code 420 has been assigned to at least one symbol. For example, mother code 420 may use symbol mapper module 330 (FIG. 3) to map or assign bits 432, 434, 436, and 438 to the same transmission symbol. For example, if the transmitter employs QPSK-modulation, then the values of the four bits 432, 434, 436, and 438 may determine one of the QPSK-symbols transmitted during first transmission 430. In an embodiment, one or more of the bit-positions of mother code 420 may be assigned to more than one symbol. The assignment of bit-positions of mother code 420 to symbols may be performed by, for example, modulator 120 (FIG. 1) or 330 (FIG. 3).

Symbol vector-level IR HARQ process 400 may then perform first transmission 430 of symbols to a receiver such as receiver 145 (FIG. 1). For example, symbol vector-level IR HARQ process 400 may transmit the symbols contained symbol vector 135 (FIG. 1) using transmit antennas 140 (FIG. 1) during first transmission 430. In an embodiment, symbols transmitted during first transmission 430 on multiple antennas may correspond to the bit-positions of mother code labeled with '1.' Thus, as shown in FIG. 4, the bits labeled with a '1,' bits 432, 434, 436, and 438, may be transmitted during first transmission 430. At the receiver, for example, receiver 145 (FIG. 1), a decoding error may be determined by, for example, decoder 180 (FIG. 1). Alternatively, a decoding timeout may occur at receiver 145 and/or decoder 180 (both of FIG. 1). In any of these cases, receiver 145 may send a request for retransmission to the transmitter, for example, transmitter 102 (FIG. 1), or the transmitter may automatically retransmit. In either case, symbol vector-level IR HARQ process 400 may perform second transmission 440, in which the bits corresponding to the same or different symbols as first transmission 430 are transmitted to the receiver. For example, as depicted in FIG. 4, all the bit-positions labeled '2' in mother code 420, bits 442, 444, 446, 448, and 449, may be transmitted in second transmission 440. Advantageously, each of these bit-positions may be assigned to one or more symbols prior to selection for transmission. For example, all symbols labeled '1' may be assigned to a symbols and all bit positions labeled '2' may be assigned to another symbol prior to transmission by symbol mapper 330 (FIG. 3).

Symbol vector-level IR HARQ process 400 may continue to transmit symbols corresponding to predetermined bit-positions of mother code 420 in successive rounds of the transmission protocol until, for example, either information bits 410 are correctly decoded at the receiver, or until a specified number of transmissions or retransmissions has occurred. For example, symbol vector-level IR HARQ process 400 may continue through third transmission 450, fourth transmission 460, and fifth transmission 470. Advantageously, each retransmission of data as shown in FIG. 4 is done on the symbol-level. That is, in each transmission the same bit-positions of mother code 420 are assigned to the same symbols, for example, by symbol mapper module 330.

As symbol vector-level IR HARQ process 400 may perform multiple rounds of transmissions, received symbols may be stored across transmissions at the receiver, for example, receiver 145 (FIG. 1). Therefore, the effective code rate of the received codeword may decrease at the receiver after each transmission, as redundant information may be received. For example, mother code 420 may have a information rate of $R_0$ (measured in, for example, bits per channel use). During first transmission 430, a code of rate $R_1$ may be transmitted, where $R_1 > 0$. During second transmission 440, a second code may be transmitted. At the receiver, symbols received during first transmission 430 and second transmission 440 may be stored and used to jointly decode information bits 410, for example, at decoder 180 (FIG. 1). Therefore, the effective code rate after second transmission 440 may be at a rate $R_2 \leq R_1$. In general after the k-th transmission (where k is a positive integer), the received symbols at the receiver will form a code having effective code rate $R_k \leq R_{k-1} \leq \ldots \leq R_1$. If symbol vector-level IR HARQ process 400 transmits symbols corresponding to the entire mother code 420, then the receiver will have an effective code rate equal to code rate of mother code 420, i.e., a code rate of $R_0$. For example, in FIG. 4, the transmitter may have transmitted all the bits of mother code 420 to the receiver after fifth transmission 470, and so the effective code rate at the receiver after fifth transmission 470 may be $R_5 = R_0$.

If symbol vector-level IR HARQ process 400 uses multiple transmissions to communication information bits, for example information bits 410, from a transmitter to receiver, symbol vector-level IR HARQ process 400 may transmit redundant symbols. For example, as depicted in FIG. 4, bits 472 and 474 are repeated, as they are transmitted during third transmission 450 and fifth transmission 470. Thus, if bits 472 and 474 together constitute a single symbol, then this symbol is repeated during third transmission 450 and fifth transmission 470. Thus, the receiver, e.g., receiver 145 (FIG. 1) may perform symbol vector-level combining on the symbol containing bits 472 and 474. To perform symbol vector-level combining, the receiver may compute one or more LLR values of the received symbol based on the multiple copies of the received symbol. The first received copy of a given symbol may be referred to as an original symbol, and subsequently received copies of that symbol may be referred to as repeated symbols.

Encoding and decoding redundant or duplicative bits on a symbol vector-level as shown in FIGS. 3-4 may be advantageous in decreasing the symbol- or bit-error rate of a communications system, such as communications system 100 (FIG. 1). For example, symbol vector-level decoding may effectively increase the operational SNR per bit at the decoder, for example, decoder 180 (FIG. 1).

Figure 5:
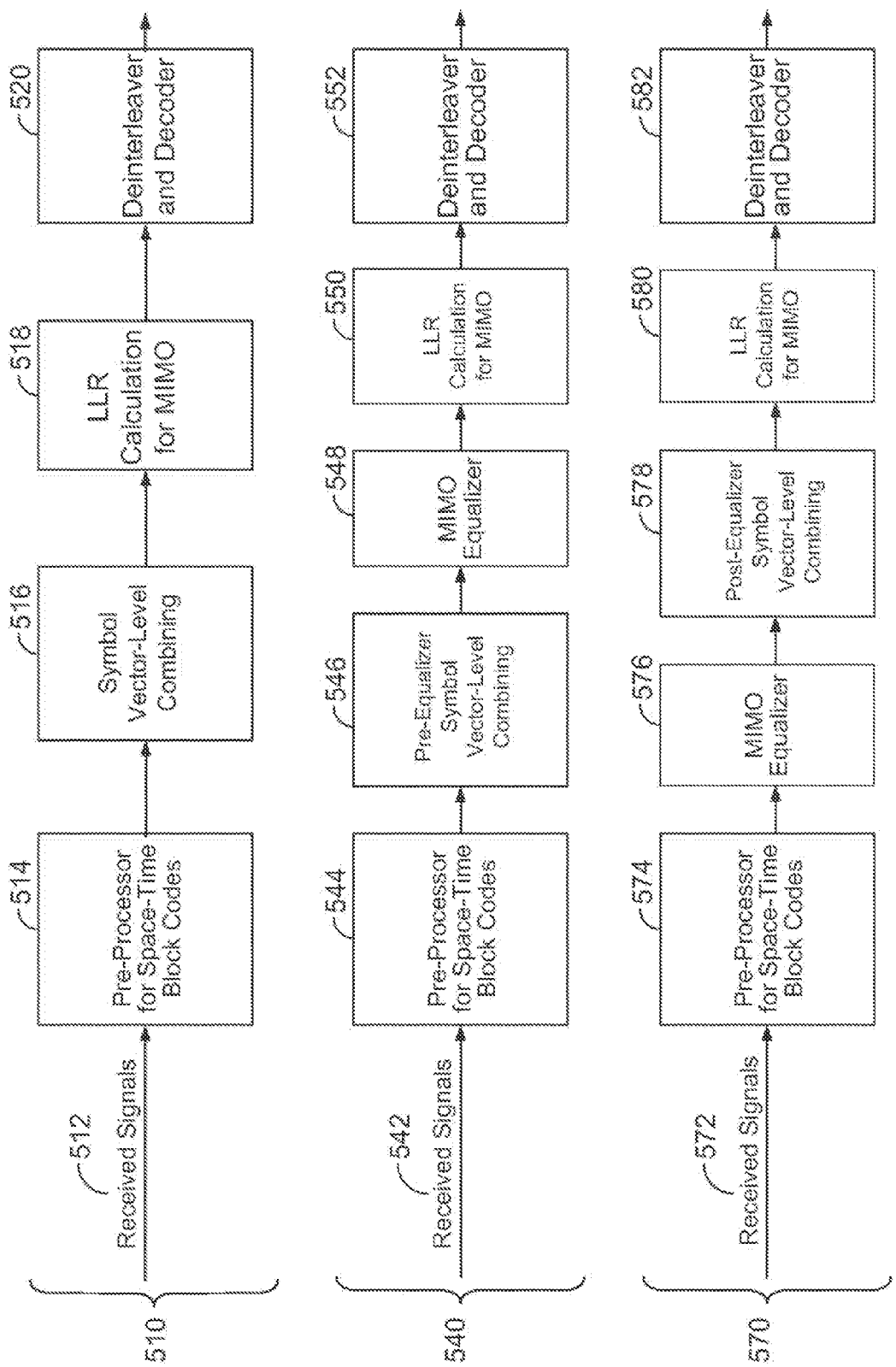
FIG. 5 depicts various embodiments of a symbol vector-level combining receiver that may be used by a communications system, such as the communications system of FIG. 1, to decode symbols transmitted according to a IR HARQ process.

FIG. 5 depicts various embodiments of a symbol vector-level combining receiver that may be used by a communications system, such as communications system 100 (FIG. 1) to decode symbols received by symbol vector-level IR HARQ process 400. Symbol vector-level receivers 510, 540, and 570 may be used in combination with, for example, transmitter 100 (FIG. 1) or transmitter 300 (FIG. 3) to provide symbol vector-level combining of received bits in an IR HARQ MIMO system.

Symbol vector-level combining receiver 510 may be used to decode received signals 512 that may be received according to symbol vector-level IR HARQ process 400. For example, received signals 512 may be obtained by combining received bits that are transmitted according to symbol vector-level IR HARQ process 400. Next, receiver 510 may pre-process received signals 512 using pre-processor for space-time block codes module 514. For example, pre-processor for space-time block codes module 514 may invert or inverse the operations performed at a corresponding transmitter module, such as space-time block coding module 360 (FIG. 3). Pre-processor for space-time block codes module 514 may alternatively or additionally separate the information contained in multiple received streams (e.g., received via receive antennas 150 (FIG. 1)) to separate estimates of the bits or symbols contained in the received streams. For example, pre-processor for space-time block codes module 514 may use linear decoding to produce a set of estimated symbol values corresponding to a number of unknown received symbol values in a set of linear equations. Additionally, pre-processor for space-time block codes module 514 may perform phase and/or frequency synchronization operations, or search for optimal values of these parameters to ensure accurate decoding of received information.

At symbol vector-level combining module 516, receiver 510 may perform symbol vector-level combining of the symbols obtained at the output of pre-processor for space-time block codes module 514 using symbol vector-level combining module 516. For example, receiver 510 may combine redundant or duplicative symbols received from multiple symbol transmissions according to symbol vector-level IR HARQ process 400 (FIG. 4). Symbol vector-level combining may be performed in any suitable, way, for example, in any way that preserves the sufficient statistics of the symbols needed for maximum likelihood decoding. In an embodiment, symbol vector-level combining may be performed by adding duplicative symbols (e.g., a symbol containing bits 472 and 474 of FIG. 4, as these symbols are transmitted both in third transmission 450 and fifth transmission 470 (both of FIG. 4)). Alternatively or additionally, symbol vector-level combining module 516 may linearly weigh or otherwise combine duplicative symbols received as received signal 512.

At LLR calculation for MIMO module 518, receiver 510 may determine one or more LLR values to decode the symbols of a codeword corresponding to, e.g., information bits 105 (FIG. 1), 210 (FIG. 2), 310 (FIG. 3), or 410 (FIG. 4). The LLR calculation may be implemented using a processor and may be computed using finite-precision and/or discrete numerical values. The LLR calculation performed by LLR calculation for MIMO module 518 may produce one or more estimated symbols, and/or it may produce soft-information. For example, LLR calculation for MIMO module 518 may produce a probability that a given symbol corresponds to a particular value.

At deinterleaver and decoder 520, receiver 510 may first deinterleave and then output a decoded codeword based on the output of LLR calculation for MIMO module 518. For example, receiver 510 may be used to decode a codeword transmitted by communications system 100 (FIG. 1) employing a HARQ transmission protocol. In this case, deinterleave and decoder 520 may first deinterleave bits or values output by LLR calculation for MIMO module 518 to restore the received bits to their original ordering prior to transmission, e.g., using transmitter 102 (FIG. 1). Deinterleaver and decoder 520 may then decode the deinterleaved bits or values to produce a decoded codeword. For example, decoder and deinterleaver 520 may decode the output of LLR calculation for MIMO module 518 according to a block decoding, turbo decoding, or Reed-Solomon decoding technique. Decoder and deinterleaver 520 may use ED decoding to detect if all errors present in received signals 512 have been corrected. For example, if a cyclic redundancy check ED technique is used a the transmitter, e.g., transmitter 102 (FIG. 1), then decoder 180 may apply a suitable detection algorithm to determine if any non-correctable errors are present in the decoded codeword. If decoder and deinterleaver 520 determines that no errors are present, or that all errors that are present are correctable, then decoder and deinterleaver 520 may output decoded bits. Decoded bits may be an exact replica of the original source bits, for example, information bits 105 (FIG. 1). If decoder and deinterleaver 520 determines that non-correctable errors are present in received signals 512, then decoder and deinterleaver 520 may request retransmission of the current symbol packet or packets. For example, receiver 510 may request retransmission of data related to information bits 105 (FIG. 1), 210 (FIG. 2), 310 (FIG. 3) or 410 (FIG. 4). The retransmitted packet or packets may not be an exact replica of the originally transmitted packet or packets, but may be related to information that provides additional redundancy to receiver 510 (as described previously in relation to FIG. 4). This retransmission process may continue according to the HARQ technique employed by the communications system until either deinterleaver and decoder 520 successfully decodes received signals 510, or until a specified number of retransmission has been attempted.

Symbol vector-level combining receiver 540 is another embodiment of a receiver that may be used to decode signals that may be received according to symbol vector-level IR HARQ process 400 (FIG. 4). For example, received signals 542 may be similar or identical to received signals 512, pre-processor for space-time block codes 544 may be similar or identical to pre-processor for space-time block codes 514, LLR calculation for MIMO module 550 may operate similarly or identically to LLR calculation for MIMO module 518, and deinterleaver and decoder 552 may operate similarly or identically to deinterleaver and decoder 520. Symbol vector-level combining receiver 540 may combine received signals, for example, received signals 542 on a symbol vector-level using pre-equalization symbol vector-level combining module 546. Pre-equalization symbol vector-level combining module 546 may operate using techniques similar or identical to techniques used by symbol vector-level combining module 516.

In contrast to receiver 510, receiver 540 may perform equalization of the received information, e.g., to compensate for the effects of a degradative wireless channel over which received signals 542 are received. For example, MIMO-equalizer 548 may attempt to cancel or exploit the frequency selectivity of the wireless channel. In an embodiment, MIMO-equalizer 548 may be used jointly with deinterleaver and decoder 552 to perform join MIMO equalization and decoding of received signals 542. MIMO equalizer 548 may employ channel estimation techniques, and/or may attempt to estimate underlying parameters of a wireless communications channel, such as parameters related to user mobility and position relative to receive antennas, e.g., receiver antennas 150 (FIG. 1). MIMO-equalizer may be either an optimal equalizer, in terms of e.g., minimizing an error rate or minimum mean-square error (MMSE) metric, or it may be suboptimal. MIMO-equalizer may use non-adaptive equalization strategies (e.g., based on long-term average channel and transmission statistics) or it may use adaptive strategies to adapt to the changing values of the channel and received signals 542. MIMO-equalizer 548 may, for example, use an adaptive least-squares algorithm to equalize the values of received signals 542.

Symbol vector-level combining receiver 570 is another embodiment of a receiver that may be used to decode signals that may be received according to symbol vector-level IR HARQ process 400 (FIG. 4). In contrast to receiver 540, receiver 570 may perform MIMO-equalization prior to symbol vector-level combining using, for example, MIMO-equalizer 576. For example, received signals 572 may be similar or identical to received signals 512, pre-processor for space-time block codes 574 may be similar or identical to pre-processor for space-time block codes module 514, LLR calculation for MIMO module 580 may operate similarly or identically to LLR calculation for MIMO module 518, and deinterleaver and decoder 582 may operate similarly or identically to deinterleaver and decoder 520. Symbol vector-level combining receiver 570 may combine received signals, for example, received signals 572 on a symbol vector-level using post-equalization symbol vector-level combining module 578. Post-equalization symbol vector-level combining module 578 may operate using techniques similar or identical to techniques used by pre-equalizer symbol vector-level combining module 546. Further, post-equalization symbol vector-level combining module 578 may be used jointly with deinterleaver and decoder 582 to jointly decode received signals 572. For example, this joint decoding may be performed using any suitable adaptive and/or iterative decoding technique.

Figure 6:
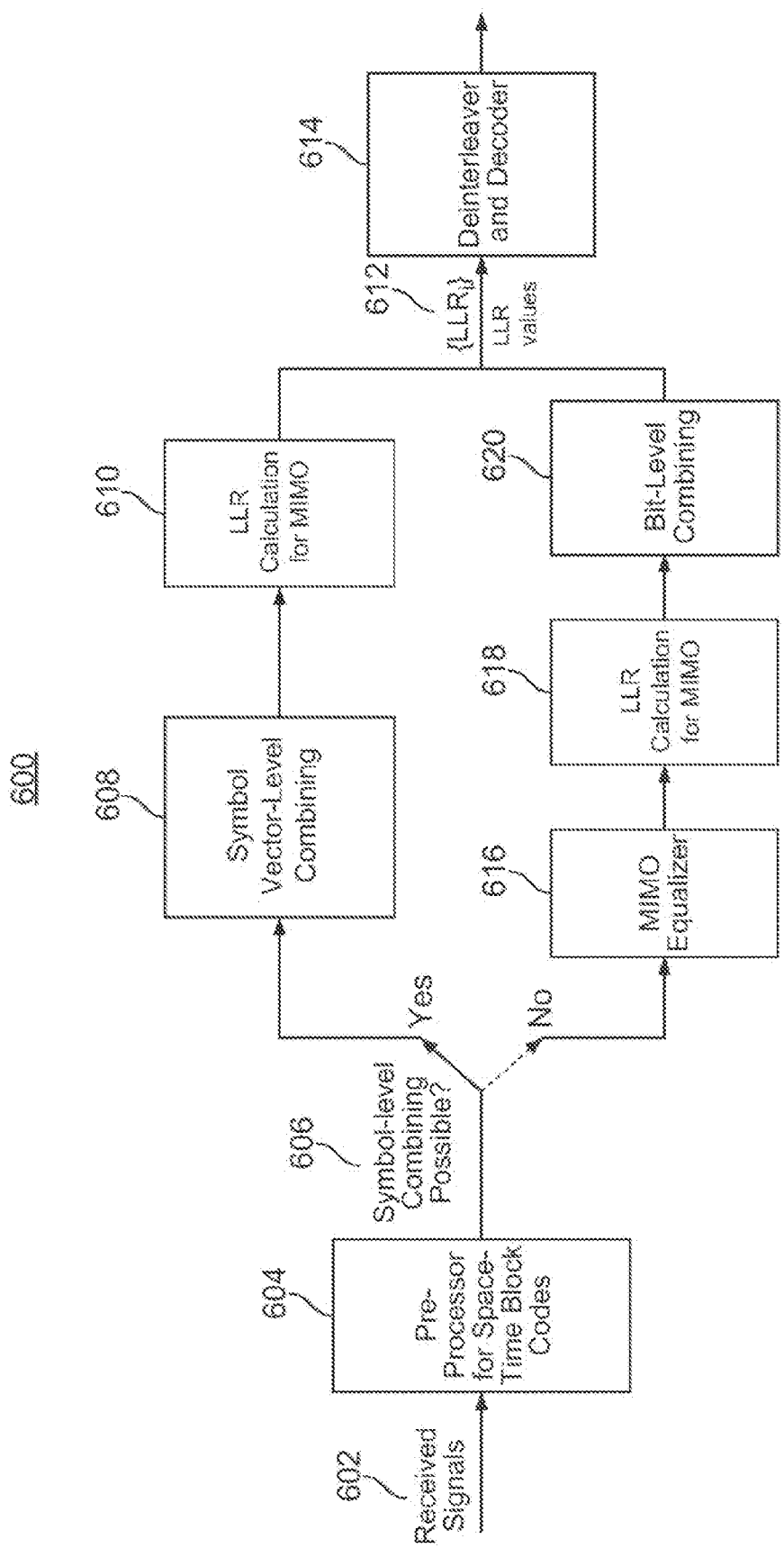
FIG. 6 shows a simplified diagram of a IR HARQ receiver that may be used to select between symbol vector-level combining and bit-level combining in accordance with an embodiment.

FIG. 6 shows a simplified diagram of a IR HARQ receiver that may be used to select between symbol vector-level combining and bit-level combining based on design parameters including the number of bits present in a received symbol vector. Receiver 600 may be a further embodiment of receiver 145 (FIG. 1), and/or may be used to receive and decode signals transmitter by transmitter 102 (FIG. 1) or 300 (FIG. 3).

Receiver 600 may receive or otherwise obtain received signals 602. For example, received signals 602 may be obtained as the output from a set of receive antennas, e.g., receive antennas 150 (FIG. 1) and/or as the output of a processing module such as antenna-to-symbol mapping module 160 (FIG. 1). Received signals 602 may be initially processed by pre-processor for space-time block codes module 604. For example, pre-processor for space-time block codes module 604 may invert or reverse the operation performed at a corresponding transmitter module, such as space-time block coding module 360 (FIG. 3). Pre-processor for space-time block codes module 604 may separate the information contained in multiple receive streams (e.g., by receive antennas 150) to separate estimates of the bits or symbols contained in the received streams. For example, pre-processor for space-time block codes module 604 may use linear decoding to produce a set of estimated symbol values corresponding to the unknowns in a set of linear equations describing the data received. Additionally, pre-processor for space-time block codes module 604 may perform phase and/or frequency synchronization operations, and/or search for optimal values of these parameters to ensure accurate decoding of received information.

At step 606, receiver 600 may determine if symbol vector-level combining of the information contained in received signals 602 is possible, e.g., using a processor or multiple processors in hardware. To determine if symbol vector-level combining is possible, receiver 600 may determine if the mother code, e.g. mother code 325 (FIG. 3) or 420 (FIG. 4), is of a length that is a multiple of the number of bits conveyed a single transmission symbol vector, e.g. symbol vector 135 (FIG. 1) or 335 (FIG. 3). If the number of bits conveyed in a single transmission vector is a multiple of the mother code length, then receiver 600 may determine that symbol vector-level combining is possible. Otherwise, receiver 600 may determine that symbol vector-level combining is not possible. For example, if there are four transmit antennas and if 32-QAM modulation is used, then each symbol vector may convey $4 \times \log_2(32) = 4 \times 5 = 30$ bits of information. If the mother code, e.g., mother code 325 (FIG. 3) or 420 (FIG. 4), is of a length that is a multiple of 20 bits (e.g., 100, 500, or 1000 bits), then receiver 600 may determine at step 606 that symbol vector-level combining is possible. If, however, the mother does is of a length that is not a multiple of 20 (e.g., 150 or 550 bits), then receiver 600 may determine at step 606 that symbol vector-level combining is not possible.

The number of bits conveyed in a single transmission vector, e.g., transmission vector 135 (FIG. 1) or 335 (FIG. 3), may depend on physical and design parameters. For example, in communications system 100, the number of bits conveyed in a single transmission vector may depend on the modulation technique used by modulator 120 (FIG. 1), the number of transmit antennas 140 (FIG. 1), the number of receive antennas 150 (FIG. 1), and/or the number of MIMO spatial streams. Therefore, receiver 600 may, at step 606, determine if symbol vector-level combining is possible by considering some or all of these parameters, individually or in combination. For example, at step 606, receiver 600 may consider the modulation technique and/or the number of spatial MIMO streams to determine if symbol vector-level combining is possible.

If receiver 600 determines that symbol vector-level combining is possible at step 606, receiver 600 may perform symbol vector-level decoding of received signals 602. For example, receiver 600 may use the decoding strategy of receiver 510, 540, or 570 (all of FIG. 5) to perform symbol vector-level decoding of received signals 602. In an embodiment, receiver 600 may use symbol vector-level combining module 608 to combine current symbols with symbols transmitted in previous iterations of a IR HARQ transmission process. Further, receiver 600 may use LLR calculation for MIMO module 610 to produce a set of LLR values based on the symbols output by symbol vector-level combining module 608. For example, LLR calculation for MIMO module 610 may output one LLR value corresponding to each symbol received in received signals 602 and/or each symbol output by symbol vector-level combining module 608.

If receiver 600 determines that symbol vector-level combining is not possible at step 606, receiver 600 may instead perform bit-level decoding of received signals 602. For example, receiver 600 may use MIMO equalizer 616 to equalize the effects of a wireless channel separating transmitters and receiver. In an embodiment, MIMO equalizer 616 may operate similarly or identically to MIMO equalizer 548 or 576 (both of FIG. 5). For example, MIMO equalizer may use channel estimation and other adaptive or non-adaptive filtering techniques to equalize the data contained in received signals 602. Receiver 600 may use then use LLR calculation for MIMO module 618 to compute LLR values associated with the received equalized symbols corresponding to received signals 602. In an embodiment, LLR calculation for MIMO module 618 may output estimated LLR values on a bit- or symbol-level, and receiver 600 may perform bit-level combining of the output. For example, receiver 600 may perform bit-level combining of the output by combining current bits with bits corresponding to the same position in the mother code transmitted in previous iterations of a IR HARQ transmission process, such as IR HARQ process 400. Bit-level combining may be performed by bit-level combining module 620.

Receiver 600 may pass LLR values 612, i.e., the output of LLR calculation for MIMO module 610 (if symbol vector-level combining is performed) or bit-level combining module 620 (if bit-level combining is performed), to deinterleaver and decoder 614. Deinterleaver and decoder 614 may then decode received signal 602 (e.g., using LLR values 612) to produce a decoded codeword, for example, corresponding to an information sequence such as information bits 105 (FIG. 1). Deinterleaver and decoder 614 may first deinterleave bits or values output by LLR calculation for MIMO module 610 or bit-level combining module 620 to restore the received bits to their original ordering prior to transmission, e.g., using transmitter 102 (FIG. 1). Deinterleaver and decoder 614 may then decode the deinterleaved bits or values to produce a decoded codeword. For example, decoder and deinterleaver 614 may perform decoding according to a block decoding, turbo decoding, or Reed-Solomon decoding technique. Decoder and deinterleaver 614 may use ED decoding to detect if all errors present in received signals 602 have been corrected. If decoder and deinterleaver 614 determines that no errors are present, or that all errors that are present are correctable, then decoder and deinterleaver 614 may output the decoded bits. The decoded bits may be an exact replica of the original source bits, for example, information bits 105 (FIG. 1).

Figure 7:
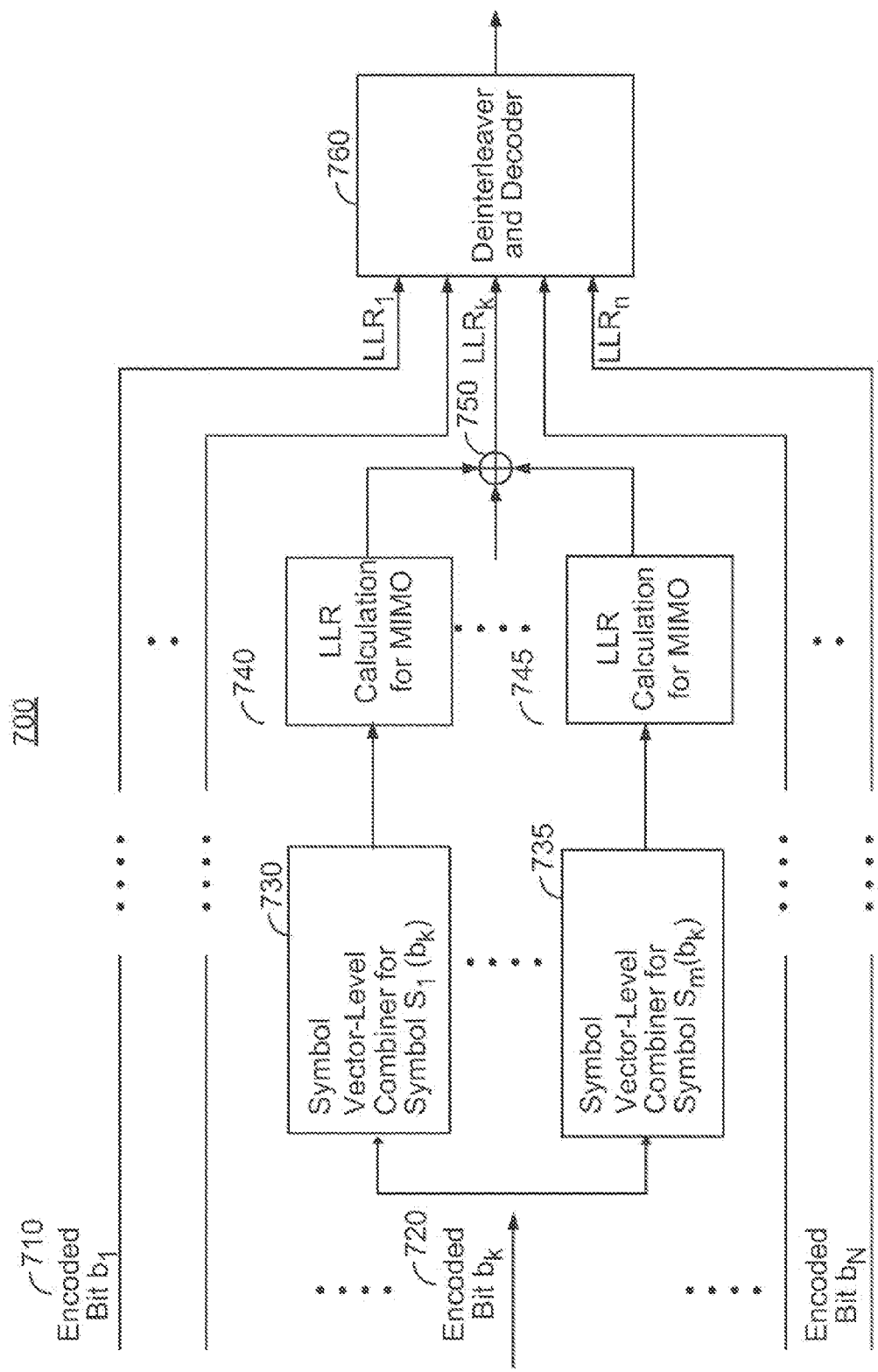
FIG. 7 shows a simplified diagram of a IR HARQ receiver that may be used for layered symbol vector-level combining in accordance with an embodiment.

FIG. 7 shows a simplified diagram of a IR HARQ receiver that may be used for layered symbol vector-level combining in accordance with an embodiment. Receiver 700 is generally the optimal receiver for the IR HARQ transmission process described in FIG. 4 and may be used to perform join bit- and symbol vector-level combining on received symbols. Receiver 700 may be used to perform optimal decoding even when the modulation type or MIMO mode (e.g., the number of spatial MIMO streams) changes over time.

Receiver 700 may generally perform symbol vector-level combining on symbols that are symbol vector-level combinable, and bit-level combining on bits contained within symbols that are not symbol vector-level combinable. A mother code, e.g., mother code 325 (FIG. 3) or 420 (FIG. 4) may consist of bits $b_1, b_2, \ldots, b_u$. If a particular bits, $b_k$, is contained with a symbol then all occurrences of that symbol may be combined and a LLR calculation may be performed on bit $b_k$. More generally, if bit $b_k$ is contained within m>0 combinable symbols, $S_1, \ldots, S_m$, then receiver 700 may perform symbol vector-level combining separately of all received copies of each symbol. For example, symbol vector-level combiner 730 may be used to combine all received copies of symbol $S_1$, which includes encoded bit $b_1$ 720. Similarly, symbol vector-level combiner 735 may be used to combine all received copies of symbol $S_m$, which also includes encoded bit $b_1$ 720. Next, the output of the m symbol vector-level combiners may be passed to a corresponding set of m LLR calculator modules, for example, including LLR calculation for MIMO modules 740 (corresponding to symbol $S_1$) and 745 (corresponding to symbol $S_m$). The LLR calculation modules may produce a total of m intermediate LLR values, for example, quantifying the probability that each of the m combined symbols is of a particular value. These m intermediate LLR values may then be combined through addition, for example, using adder 750, resulting in the LLR value of the k-th bit, and denoted by $$LLR_k = \sum_{b_k \in S_i} LLR(\text{Symbol} - \text{level Combining of } S_i).$$

A similar process may be performed for every bit of the mother code, e.g., $b_1, \ldots, b_n$, where n is the bit-length of the mother code, that is symbol vector-level combinable. For example if bit $b_2$ is symbol vector-level combinable, then bit $b_2$ may be decoded by a similar process as shown for bit $b_k$ in FIG. 6 to produce the value $LLR_2$.

For bits that are not symbol vector-level combinable, for example, because they are only included in one transmission of IR HARQ process 400 (FIG. 4), bit-level combining may be used. If bit $b_3$ is only bit-level (i.e., not symbol-level) combinable, then receiver 600 may decoder bit $b_3$ by, for example, using bit-level combining module 620 (FIG. 6) to produce the LLR value $LLR_3$.

All encoded bits (i.e., bits that are only bit-level combinable and bits that are symbol vector-level combinable) may produce a set of LLRs values, $LLP_1, \ldots, LLR_n$, which are then passed to deinterleaver and decoder 760. Deinterleaver and decoder 760 may first deinterleave and then output a decoded codeword based on the values $LLR_1, \ldots, LLR_n$. Deinterleaver and decoder 760 may decode the deinterleaver bits or values to produce a decoded codeword corresponding to, e.g., information bits 105 (FIG. 1). Decoder and deinterleaver 760 may use the values $LLR_1, \ldots, LLR_n$ to decode using a block decoding, turbo decoding, or Reed-Solomon decoding technique. Decoder and deinterleaver 760 may use ED decoding to detect if all errors present in received signals 512 have been corrected. If decoder and deinterleaver 760 determines that no errors are present, or that all errors that are present are correctable, then decoder and deinterleaver 760 may output decoded bits. Decoded bits may be an exact replica of the original source bits, for example, information bits 105 (FIG. 1). If decoder and deinterleaver 760 determines that non-correctable errors are present in the decoded bits, then decoder and deinterleaver 760 may request retransmission of the current symbol packet or packets. For example, receiver 700 may request retransmission of data related to information bits 105 (FIG. 1), 210 (FIG. 2), 310 (FIG. 3) or 410 (FIG. 4). The retransmitted packet or packets may not be an exact replica of the originally transmitted packet or packets, but may be related to information that provides additional redundancy to receiver 700. This retransmission process may continue according to the IR HARQ technique employed by the communications system until either decoder and deinterleaver 760 successfully decodes encoded bits $b_1, \ldots, b_n$ or until a specified number of retransmission has been attempted.

The foregoing describes systems, methods, and techniques for performing symbol vector-level combining in a MIMO IR HARQ communications system to improve decoding performance. Those skilled in the art will appreciate that the invention can be practices by other than the described embodiments, which are presented for the purpose of illustration rather than of limitation.

What is claimed is:

1. A method for transmitting a mother code, the method comprising:
    encoding and interleaving a set of information bits to produce the mother code;
    assigning each bit position of the mother code to one output symbol in a plurality of output symbols;
    mapping each output symbol in the plurality of output symbols to a corresponding transmission device in a plurality of transmission devices; and
    performing one or more transmissions of output symbols from the plurality of output symbols, each transmission comprising:
        puncturing the mother code by selecting one or more output symbols from the plurality of output symbols, wherein the selecting is subsequent to the mapping of each output symbol in the plurality of output symbols to its corresponding transmission device; and
        transmitting each output symbol in the selected one or more output symbols on its corresponding transmission device.

2. The method of claim 1, wherein a transmission in the one or more transmissions is performed in response to a time-out at the MIMO transmitter.

3. The method of claim 1, wherein the one or more transmissions further comprises:
    in response to receiving a retransmission request, transmitting additional information on the mother code by:
        re-puncturing the mother code by selecting the one or more output symbols previously transmitted and one or more additional output symbols not previously transmitted from the plurality of output symbols, wherein the re-puncturing is based on the assigning of each bit position of the mother code to the one output symbol in the plurality of output symbols; and
        transmitting each output symbol in the one or more output symbols previously transmitted and each output symbol in the one or more additional output symbols on their corresponding transmission devices.

4. The method of claim 1, wherein encoding and interleaving the set of information bits comprises applying an error detection (ED) code and a forward error correction code (FEC) to the set of information bits.

5. The method of claim 1, wherein the transmitting each output symbol in the selected one or more output symbols is performed using a modulation selected from the group consisting of Binary Phase Shift Keying, Quadrature Phase Shift Keying, and Quadrature Amplitude Modulation.

6. The method of claim 1, wherein at least one output symbol in the plurality of output symbols is not transmitted by a multiple-input multiple-output (MIMO) transmitter.

7. The method of claim 1, wherein a number of multiple-input multiple-output (MIMO) spatial streams corresponding to a MIMO transmitter varies with time.

8. The method of claim 1, wherein puncturing the mother code is based, at least in part, on a target code rate for the one or more transmissions.

9. The method of claim 4, wherein the FEC code is selected from the group consisting of a block code, a Turbo code, and a Reed-Solomon code.

10. The method of claim 3, wherein a number of bit positions assigned to each of the plurality of output symbols is an integer multiple of a bit length of the mother code, wherein puncturing the mother code comprises selecting a first instance of the selected one or more output symbols, wherein re-puncturing the mother code by selecting the one or more output symbols comprises selecting a second instance of the one or more output symbols, and wherein the first instance and the second instance of the one or more output symbols are symbol-level combinable based, at least in part, on the number of bit positions assigned to the one or more output symbols.

11. A system for transmitting a mother code, the system comprising:
    an encoder configured to encode and interleave a set of information bits to produce the mother code;
    a symbol mapper configured to assign each bit position of the mother code to one output symbol in a plurality of output symbols;
    a transmission device mapper configured to map each output symbol in the plurality of output symbols to a corresponding transmission device in a plurality of transmission devices; and
    a multiple-input multiple-output (MIMO) transmitter configured to perform one or more transmissions of output symbols from the plurality of output symbols by:
        puncturing the mother code by selecting one or more output symbols from the plurality of output symbols, wherein the selecting is subsequent to the mapping of each output symbol in the plurality of output symbols to its corresponding transmission device; and
        transmitting each output symbol in the selected one or more additional output symbols on its corresponding transmission device.

12. The system of claim 11, wherein the MIMO transmitter is further configured to perform a transmission in the one or more transmissions in response to a time-out at the MIMO transmitter.

13. The system of claim 11, wherein the MIMO transmitter is further configured to:
    in response to receiving a retransmission request, transmit additional information on the mother code by:
        re-puncturing the mother code by selecting the one or more output symbols previously transmitted and one or more additional output symbols not previously transmitted from the plurality of output symbols, wherein the re-puncturing is based on the assigning of each bit position of the mother code to the one output symbol in the plurality of output symbols; and
        transmitting each output symbol in the one or more output symbols previously transmitted and each output symbol in the one or more additional output symbols on their corresponding transmission devices.

14. The system of claim 11, wherein the encoder is further configured to encode and interleave the set of information bits by applying an error detection (ED) code and a forward error correction code (FEC) to the set of information bits.

15. The system of claim 11, wherein the MIMO transmitter is further configured to transmit each output symbol in the one or more output symbols using a modulation selected from the group consisting of Binary Phase Shift Keying, Quadrature Phase Shift Keying, and Quadrature Amplitude Modulation.

16. The system of claim 11, wherein at least one output symbol in the plurality of output symbols is not transmitted by the MIMO transmitter.

17. The system of claim 11, wherein the MIMO transmitter is further configured to vary a number of MIMO spatial streams corresponding to the MIMO transmitter with time.

18. The system of claim 11, wherein the MIMO transmitter is further configured to puncture the mother code based, at least in part, on a target code rate for the one or more transmissions.

19. The system of claim 14, wherein the encoder is further configured to select the FEC code from the group consisting of a block code, a Turbo code, and a Reed-Solomon code.

20. The system of claim 11, wherein a number of bit positions assigned to each of the plurality of output symbols is an integer multiple of a bit length of the mother code, wherein puncturing the mother code by selecting the one or more output symbols comprises selecting a first instance of the one or more output symbols, wherein re-puncturing the mother code by selecting the one or more output symbols comprises selecting a second instance of the one or more output symbols, and wherein the first instance and the second instance of the one or more output symbols are symbol-level combinable based, at least in part, on the number of bit positions assigned to the one or more output symbols.

* * * * *